United States Patent
Gou et al.

(10) Patent No.: US 10,849,120 B2
(45) Date of Patent: Nov. 24, 2020

(54) METHODS, APPARATUS AND SYSTEMS FOR DETERMINING A SIZE OF A FEEDBACK SIGNAL IN A WIRELESS COMMUNICATION

(71) Applicant: ZTE CORPORATION, Guangdong (CN)

(72) Inventors: Wei Gou, Guangdong (CN); Peng Hao, Guangdong (CN); Feng Bi, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/506,777

(22) Filed: Jul. 9, 2019

(65) Prior Publication Data
US 2019/0335435 A1 Oct. 31, 2019

Related U.S. Application Data

(63) Continuation of application No. PCT/CN2017/111732, filed on Nov. 17, 2017.

(51) Int. Cl.
*H04W 72/04* (2009.01)
*H04L 1/06* (2006.01)
(Continued)

(52) U.S. Cl.
CPC ......... *H04W 72/042* (2013.01); *H04L 1/0643* (2013.01); *H04L 1/0687* (2013.01); *H04L 1/1816* (2013.01); *H04L 5/0055* (2013.01)

(58) Field of Classification Search
CPC ............ H04W 72/042; H04W 72/1289; H04L 5/0055; H04L 1/1816; H04L 1/0687; H04L 1/0643; H04L 1/1614
See application file for complete search history.

(56) References Cited

U.S. PATENT DOCUMENTS

2011/0237283 A1* 9/2011 Shan .................. H04W 72/042
455/509
2012/0020299 A1* 1/2012 Chun .................. H04L 1/1607
370/328

(Continued)

FOREIGN PATENT DOCUMENTS

WO 2019099569 A1 5/2019

OTHER PUBLICATIONS

Interdigital, Inc., "CBG-based (re)-transmission", 3GPP TSG RAN WG1 Meeting 90bis, R1-1718363, Prague, CZ, Oct. 9-13, 2017, 5 pages.

*Primary Examiner* — Ajit Patel
*Assistant Examiner* — Wilfred Thomas
(74) *Attorney, Agent, or Firm* — Duane Morris LLP

(57) ABSTRACT

Methods, apparatus and systems for determining a size of a feedback signal in a wireless communication are disclosed. In one embodiment, a method performed by a wireless communication device is disclosed. The method comprises: receiving first downlink control information having a first format and second downlink control information having a second format from a wireless communication node; receiving a plurality of transport blocks from the wireless communication node; and transmitting a plurality of feedback signals to the wireless communication node. Each of the plurality of transport blocks is scheduled by one of the first downlink control information and the second downlink control information. Each of the plurality of feedback signals has the same size and corresponds to a respective one of the plurality of transport blocks.

16 Claims, 9 Drawing Sheets

(51) Int. Cl.
*H04L 1/18* (2006.01)
*H04L 5/00* (2006.01)
*H04L 1/16* (2006.01)
*H04W 72/12* (2009.01)

(56) References Cited

U.S. PATENT DOCUMENTS

| | | | |
|---|---|---|---|
| 2013/0128838 A1* | 5/2013 | Montojo | H04L 1/0038 |
| | | | 370/329 |
| 2016/0036578 A1* | 2/2016 | Malladi | H04L 5/0057 |
| | | | 370/329 |
| 2018/0159675 A1* | 6/2018 | Yang | H04W 72/0413 |
| 2018/0227156 A1* | 8/2018 | Papasakellariou | H04L 5/0048 |
| 2018/0367253 A1* | 12/2018 | Nammi | H04L 1/1812 |
| 2019/0149271 A1* | 5/2019 | Yin | H04L 1/1816 |
| | | | 370/329 |
| 2019/0230642 A1* | 7/2019 | Baldemair | H04L 1/1614 |
| 2019/0335435 A1* | 10/2019 | Gou | H04L 5/0055 |
| 2020/0059327 A1* | 2/2020 | Kini | H04L 1/1861 |
| 2020/0084004 A1* | 3/2020 | Wang | H04L 1/00 |

\* cited by examiner

METHODS, APPARATUS AND SYSTEMS FOR DETERMINING A SIZE OF A FEEDBACK SIGNAL IN A WIRELESS COMMUNICATION

CROSS-REFERENCE TO RELATED APPLICATION

The present application claims priority to PCT international application PCT/CN2017/111732, entitled "METHODS, APPARATUS AND SYSTEMS FOR DETERMINING A SIZE OF A FEEDBACK SIGNAL IN A WIRELESS COMMUNICATION," filed on Nov. 17, 2017, which is expressly incorporated by reference herein in its entirety.

TECHNICAL FIELD

The disclosure relates generally to wireless communications and, more particularly, to methods, apparatus and systems for determining a size of a feedback signal in a wireless communication.

BACKGROUND

Wireless networking systems have become a prevalent means by which a majority of people worldwide has come to communicate. A typical wireless communication network (e.g., employing frequency, time, and/or code division techniques) includes one or more base stations (typically known as a "BS") that each provides a geographical radio coverage, and one or more wireless user equipment devices (typically know as a "UE") that can transmit and receive data within the radio coverage. Such communication between the BS and UE can be degraded due to channel variations and/or interference and power variations. In this regard, the UE may use a pre-defined protocol and/or follow a higher-layer instruction to measure corresponding reference signal(s) so as to estimate channel conditions, which is typically represented as "channel state information (CSI)" that is fed back to the BS. According to the CSI report from the UE, the BS can have a better knowledge of the channels and UE ability.

In the next generation of wireless communication technology, e.g. the fifth-generation (5G) new radio (NR) network, a code block group (CBG) retransmission mechanism is supported. That is, the UE can perform feedback according to each CBG in a transport block; and the BS retransmits the CBG that is not correctly decoded without retransmission of the entire transport block, which helps to reduce the amount of retransmitted data.

In addition, in the NR system, when the UE is configured with the CBG retransmission mechanism, after the BS schedules a transport block (TB) for the UE by using a fallback DCI (downlink control information), if the feedback signal corresponding to the TB is not multiplexed with other feedback signals from the UE, the UE is required to transmit a TB-level feedback signal. But this poses a problem. If the UE is configured with the CBG retransmission mechanism, and if the BS schedules the TB for the UE by using the fallback DCI and the feedback signal corresponding to the TB is to be multiplexed with other feedback signals from the UE, there is no existing method for the UE to form a feedback signal for the TB without confusing the BS. Thus, existing systems and methods for determining a size of a feedback signal in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication device is disclosed. The method comprises: receiving first downlink control information having a first format and second downlink control information having a second format from a wireless communication node; receiving a plurality of transport blocks from the wireless communication node; and transmitting a plurality of feedback signals to the wireless communication node. Each of the plurality of transport blocks is scheduled by one of the first downlink control information and the second downlink control information. Each of the plurality of feedback signals has the same size and corresponds to a respective one of the plurality of transport blocks.

In a further embodiment, a method performed by a wireless communication node is disclosed. The method comprises: transmitting first downlink control information having a first format and second downlink control information having a second format to a wireless communication device; transmitting a plurality of transport blocks to the wireless communication device; and receiving a plurality of feedback signals from the wireless communication device. Each of the plurality of transport blocks is scheduled by one of the first downlink control information and the second downlink control information. Each of the plurality of feedback signals has the same size and corresponds to a respective one of the plurality of transport blocks.

In a different embodiment, a wireless communication device configured to carry out a disclosed method in some embodiment is disclosed.

In yet another embodiment, a wireless communication node configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
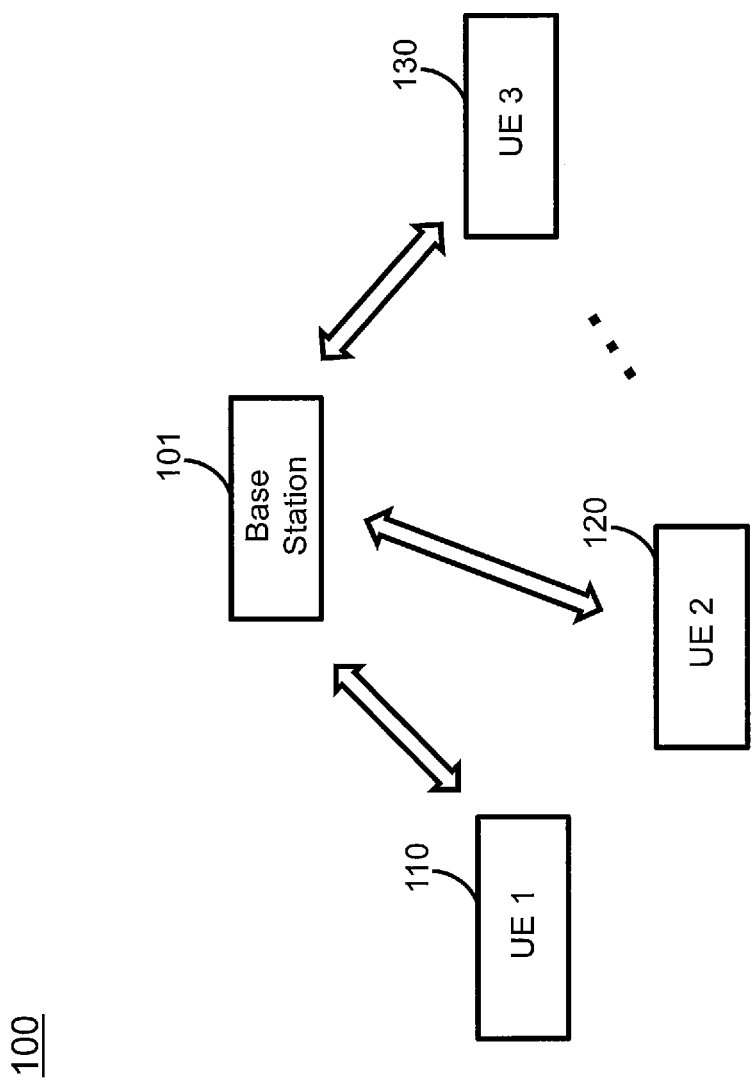
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

In the next generation of wireless communication technology, e.g. the fifth-generation (5G) new radio (NR) network, in order to improve data retransmission efficiency, a code block group (CBG) retransmission mechanism is introduced. That is, when the UE transmits a feedback signal, e.g. Hybrid Automatic Repeat Request Acknowledgement (HARQ-ACK), it may perform feedback according to each CBG in a transport block (TB). The BS retransmits the CBG that is not correctly decoded without retransmitting the entire TB, which is beneficial for reducing the amount of retransmitted data. For example, each CBG corresponds to 1-bit HARQ-ACK information. In one example, the maximum number of CBGs that a TB can be divided into is 8; and the BS may notify the UE a specific number of divided CBGs. If a TB is divided into multiple CBGs, then the UE can feed back HARQ-ACK separately for multiple CBGs. Such HARQ-ACK based on CBG may be referred to as CBG HARQ-ACK. Compared with a HARQ-ACK based on TB, which is referred to as TB HARQ-ACK, the CBG HARQ-ACK feeds back more HARQ-ACK bits than the TB HARQ-ACK.

In addition, in the NR system, when the UE is configured with the CBG retransmission mechanism, after the BS schedules a TB for the UE by using a fallback DCI, if the feedback signal corresponding to the TB is not multiplexed with other feedback signals from the UE, the UE is required to transmit a TB-level feedback signal. But this poses a problem if the feedback signal corresponding to the TB is to be multiplexed with other feedback signals from the UE. In this case, since the BS is not sure whether the UE correctly receives the DCI, the BS cannot accurately determine the total number of bits of a multiplexed signal, e.g. HARQ-ACK, fed back by the UE. As such, the BS cannot detect the HARQ-ACK, or the detection is too complicated.

The present disclosure provides a method for determining a size of a feedback signal, when (a) a UE is configured with a CBG retransmission mechanism, (b) multiple TBs are scheduled for the UE, and (c) HARQ-ACKs for the multiple TBs are required to be multiplexed during feedback. When some or all of the TBs are scheduled using fallback DCI, the UE may determine the number of feedback bits for these TBs in the following manner: the number of bits in the feedback signal corresponding to the TB is equal to the number of HARQ-ACK bits when the TB is fed back according to each CBG.

Further, the TB HARQ-ACK is formed for the TB and extended to a required number of bits by a coding rule. The required number of bits herein may be the number of HARQ-ACK bits when the TB is fed back according to each CBG. Further, the extension by the coding rule may include that: the UE forms a TB HARQ-ACK for the TB and extends in a repeated manner up to a required number of bits; or, the UE forms a TB HARQ-ACK for the TB and then fills the TB HARQ-ACK with reserved bits to extend it to the required number of bits. For example, the first bit is TB HARQ-ACK and then the TB HARQ-ACK is refilled with 7 bits to become 8 bits, where it is assumed that the number of CBG HARQ-ACK feedback bits is 8.

When the fallback DCI is used for scheduling a feedback signal, e.g. HARQ-ACK, that is multiplexed by multiple TBs, the disclosed method can avoid an inconsistent understanding, between the BS and the UE, about the number of HARQ-ACK bits that the UE fed back when the UE missed the detection of the fallback DCI.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can include, or be implemented as, a next Generation Node B (gNB), an E-UTRAN Node B (eNB), a Transmission/Reception Point (TRP), an Access Point (AP), etc.; while a UE in the present disclosure can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE1 110, UE2 120 ... UE3 130, where the BS 101 can communicate with the UEs according to some wireless protocols. For example, before a downlink transmission, the BS 101 transmits downlink control information (DCI) to a UE, e.g. UE1 110, to schedule a transport block (TB) to be transmitted from the BS 101 to the UE1 110. When CBG retransmission is supported in the network, the TB is divided into multiple CBGs.

After the BS 101 transmits the transport block to the UE1 110, the UE1 110 can transmit a feedback signal corresponding to the transport block to the BS 101. The feedback signal may indicate an acknowledgement (ACK) or a negative acknowledgement (NACK) at the TB level or at the CBG level. If a negative acknowledgement of the entire TB is fed back to the BS 101, the BS 101 may retransmit the TB to the UE1 110. If a negative acknowledgement of a CBG is fed back to the BS 101, the BS 101 may retransmit the CBG to the UE1 110, without retransmitting other CBGs in the TB if they are acknowledged by the UE1 110.

When the BS schedules a TB for the UE with DCI, the DCI can inform the UE about the transmission resource to be used for transmitting the feedback signal, e.g. HARQ-ACK, corresponding to the TB. The transmission resource information may include identification for a slot to be used for the feedback, a physical uplink control channel (PUCCH) resource in the slot, e.g. frequency resource, code resource, etc. Feedback signals corresponding to different TBs may be multiplexed using the same transmission resource or transmitted separately using different or distinct transmission resources. For example, the BS may schedule TB1 in slot n for a UE and inform the UE that a feedback signal corresponding to TB1 is to be transmitted in slot n+8 using PUCCH resource 1; then schedule TB2 in slot n+1 for the UE and inform the UE that a feedback signal corresponding to TB2 is to be transmitted in slot n+8 using PUCCH resource 1 as well. As such, the BS requests the UE that feedback signals corresponding to TB1 and TB2 be multiplexed using the same transmission resource.

The DCI used to schedule a TB may have different formats, e.g. a fallback mode DCI or a non-fallback mode DCI. When a fallback mode DCI is used to schedule the TB, a feedback signal corresponding to the TB will be at the TB level if it is not required to be multiplexed with other feedback signals. When a non-fallback mode DCI is used to schedule the TB, a feedback signal corresponding to the TB will be at the CBG level if it is not required to be multiplexed with other feedback signals. According to various embodiments of the present disclosure, if the feedback signal is required to be multiplexed with other feedback signals, and when a fallback mode DCI is used to schedule the TB, the UE may determine the number of feedback bits for the TB to be equal to the number of feedback bits when the TB is fed back at the CBG level, to be same as the number of feedback bits in a feedback signal that is multiplexed with this feedback signal and corresponds to a TB scheduled by a non-fallback DCI.

Figure 2:
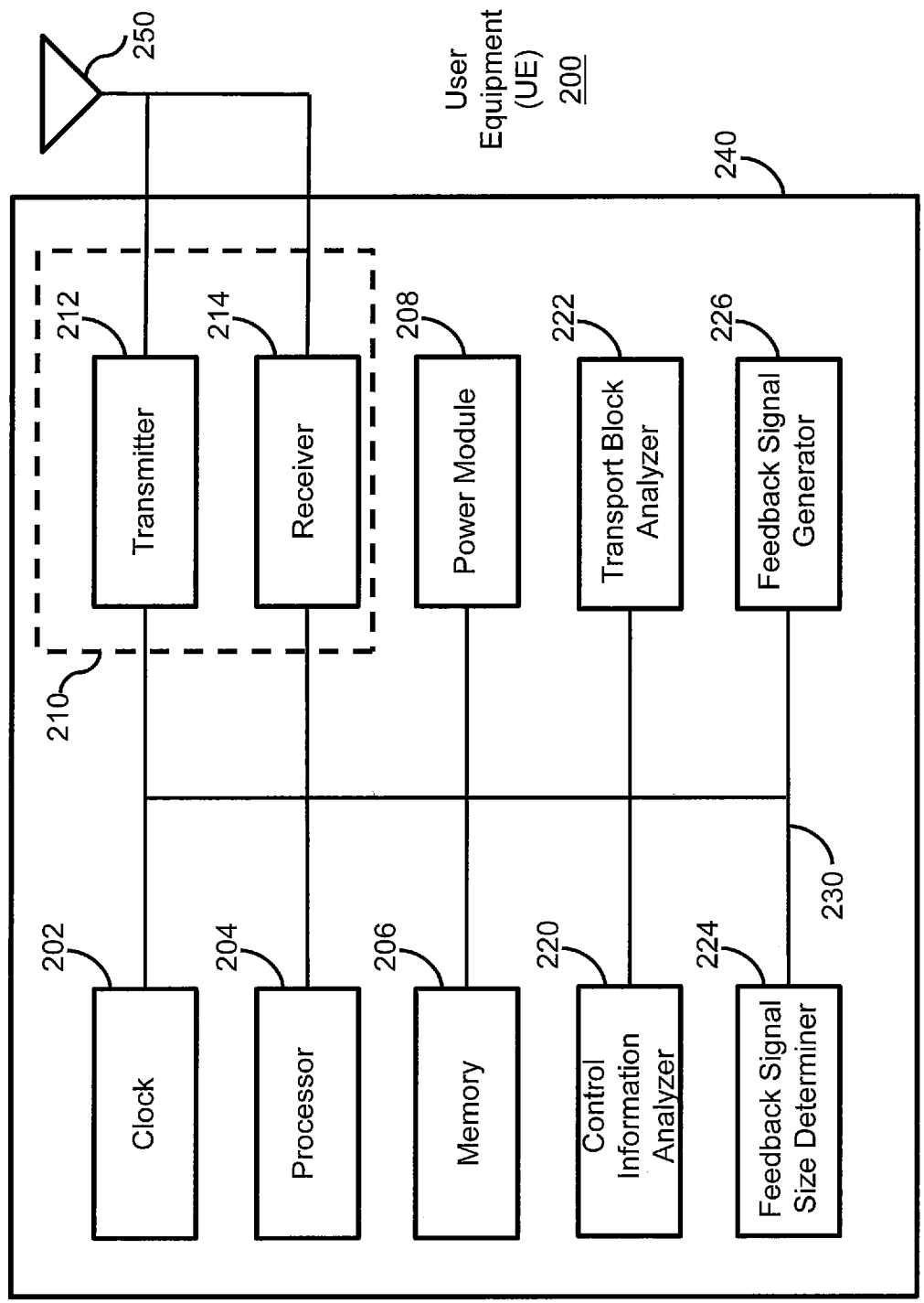
FIG. 2 illustrates a block diagram of a user equipment (UE), in accordance with some embodiments of the present disclosure.

FIG. 2 illustrates a block diagram of a user equipment (UE) 200, in accordance with some embodiments of the present disclosure. The UE 200 is an example of a device that can be configured to implement the various methods described herein. As shown in FIG. 2, the UE 200 includes a housing 240 containing a system clock 202, a processor 204, a memory 206, a transceiver 210 comprising a transmitter 212 and receiver 214, a power module 208, a control information analyzer 220, a transport block analyzer 222, a feedback signal size determiner 224, and a feedback signal generator 226.

In this embodiment, the system clock 202 provides the timing signals to the processor 204 for controlling the timing of all operations of the UE 200. The processor 204 controls the general operation of the UE 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the UE 200 to transmit and receive data to and from a remote device (e.g., the BS or another UE). An antenna 250 is typically attached to the housing 240 and electrically coupled to the transceiver 210. In various embodiments, the UE 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the UE 200 may receive control information from a BS. The control information may be DCI with different formats. For example, the control information analyzer 220 may receive, via the receiver 214, first DCI having a first format and second DCI having a second format from the BS, and analyze the DCIs. The DCIs may be used to schedule a plurality of TBs to be transmitted from the BS to the UE 200. Based on the analysis, the control information analyzer 220 can determine whether feedback signals corresponding to the plurality of TBs are to be multiplexed using the same transmission resource or transmitted separately using different transmission resources. In one example, the first format indicates fallback mode DCI, where a transport block scheduled by the first format is required to trigger a feedback having a first size when not being multiplexed with other transport blocks; and the second format indicates non-fallback mode DCI, where a transport block scheduled by the second format is required to trigger a feedback having a second size when not being multiplexed with other transport blocks. The second size is different from the first size. The control information analyzer 220 may send the analyzed DCI to the feedback signal size determiner 224 for determining a size of a feedback signal, and to the feedback signal generator 226 for generating the feedback signals.

The transport block analyzer 222 in this example receives, via the receiver 214, a plurality of transport blocks from the BS. Each of the plurality of transport blocks is scheduled by one of the first DCI and the second DCI. The transport block analyzer 222 may analyze the received transport blocks, e.g. by detecting and decoding each of them to obtain downlink data from the BS. The detection and/or decoding results of the transport blocks at the transport block analyzer 222 may be sent to the feedback signal size determiner 224 for determining a size of a feedback signal, and to the feedback signal generator 226 for generating the feedback signals corresponding to the transport blocks.

The feedback signal size determiner 224 in this example can receive the analyzed DCI from the control information analyzer 220 and receive the detection and/or decoding results of the transport blocks from the transport block analyzer 222. The feedback signal size determiner 224 determines a size of a feedback signal corresponding to each of the transport blocks, based on the analyzed DCI scheduling the transport block and/or the detection and decoding result of the transport block. In one example, each transport block scheduled by the non-fallback DCI includes the same number of code block groups; and the feedback signal size determiner 224 determines that a feedback signal corresponding to each transport block scheduled by the fallback DCI includes the same number of feedback bits as the number of code block groups when the feedback signal is multiplexed with another feedback signal corresponding to a transport block scheduled by the non-fallback DCI.

In one embodiment, the plurality of transport blocks are carried by at least one carrier; and transport blocks carried by the same carrier have the same number of code block groups. Then the feedback signal size determiner 224 can determine that a feedback signal corresponding to a first transport block scheduled by the fallback DCI includes the same number of feedback bits as the number of code block groups in a second transport block that is scheduled by the non-fallback DCI and carried by the same carrier as the first transport block.

In another embodiment, the feedback signal size determiner 224 can determine that a feedback signal corresponding to a first transport block scheduled by the fallback DCI includes the same number of feedback bits as the number of code block groups in a second transport block that is scheduled by the second downlink control information; and the number is configured by the latest high layer signal, e.g. a Radio Resource Control (RRC) signal, correctly received by the UE 200.

In yet another embodiment, the feedback signal size determiner 224 can determine that a feedback signal corresponding to each transport block includes the same and fixed number of bits set by the UE 200 and the BS, where the number is fixed regardless of the carrier information or configuration information of the high layer signal.

The feedback signal generator 226 in this example may receive the analyzed DCI from the control information analyzer 220, receive the detection and/or decoding results of the transport blocks from the transport block analyzer 222, and receive the feedback signal sizes from the feedback signal size determiner 224. Based on the information, the feedback signal generator 226 can generate a plurality of feedback signals each of which corresponds to a respective one of the plurality of transport blocks, and transmit, via the transmitter 212, the plurality of feedback signals to the BS. In one example, the feedback signals have the same size regardless of the formats of DCI scheduling the transport blocks. For each transport block scheduled by fallback DCI, the feedback signal generated by the feedback signal generator 226 for the transport block may have a structure based on the detection and/or decoding result of the transport block from the transport block analyzer 222, and the feedback signal size from the feedback signal size determiner 224, according to various embodiments.

Figure 6:
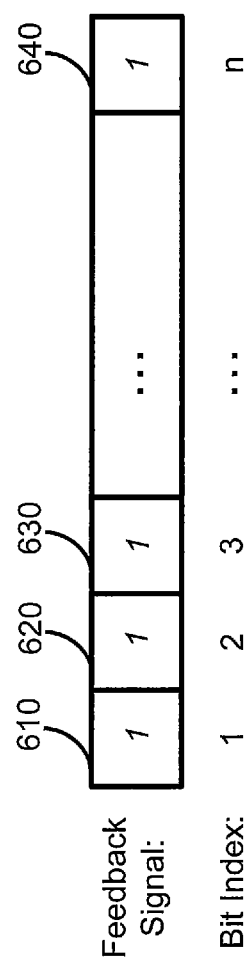
FIG. 6 illustrates an exemplary structure of a feedback signal corresponding to a transport block, in accordance with some embodiments of the present disclosure.

In one embodiment, each of the feedback bits indicates an acknowledgement of the transport block when the transport block analyzer 222 detects and correctly decodes the transport block. FIG. 6 illustrates an exemplary structure of a feedback signal corresponding to a transport block, in accordance with this embodiment. As shown in FIG. 6, while the first bit 610 of the feedback signal is 1 and indicates an acknowledgement at the TB level, the remaining bits 620, 630, 640 are filled up by repeating the first bit 610.

Figure 7:
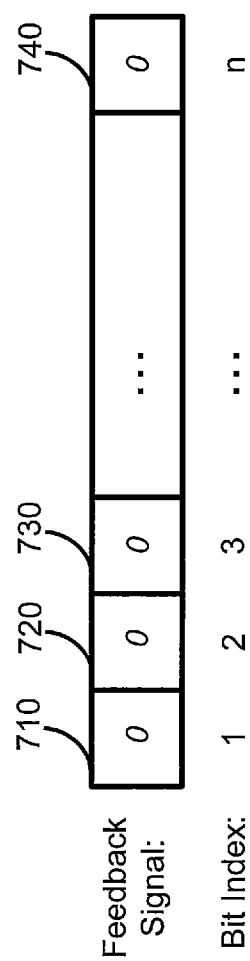
FIG. 7 illustrates another exemplary structure of a feedback signal corresponding to a transport block, in accordance with some embodiments of the present disclosure.

In one embodiment, each of the feedback bits indicates a negative acknowledgement of the transport block, when the transport block analyzer 222 detects but does not correctly decode the transport block or when the transport block analyzer 222 misses detection of the transport block. When the transport block analyzer 222 misses detection of the transport block, the UE 200 may use a mechanism, e.g. a downlink assignment index (DAI) mechanism, to identify the missed transport block and the location of the missed transport block within the plurality of transport blocks. FIG. 7 illustrates an exemplary structure of a feedback signal corresponding to a transport block, in accordance with this embodiment. As shown in FIG. 7, while the first bit 710 of the feedback signal is 0 and indicates a negative acknowledgement at the TB level when there is a decoding error or a detection missing of the transport block, the remaining bits 720, 730, 740 are filled up by repeating the first bit 710.

Figure 8:
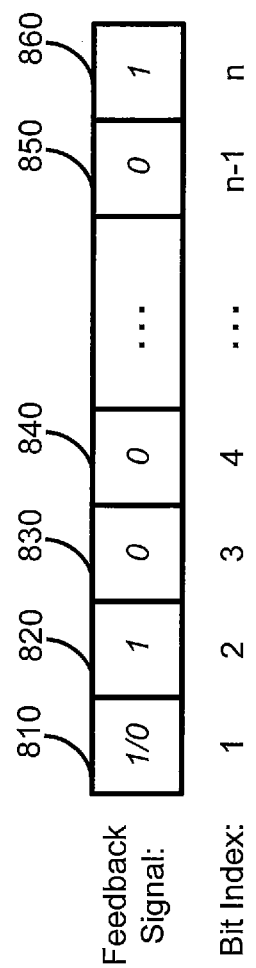
FIG. 8 illustrates yet another exemplary structure of a feedback signal corresponding to a transport block, in accordance with some embodiments of the present disclosure.

In another embodiment, one of the feedback bits indicates an acknowledgement of the transport block when the transport block analyzer 222 detects and correctly decodes the transport block, and indicates a negative acknowledgement of the transport block when the transport block analyzer 222 detects but does not correctly decode the transport block, and indicates a negative acknowledgement of the transport block when the transport block analyzer 222 misses detection of the transport block; and the remaining feedback bits have a predetermined pattern set by the UE 200 and the BS. FIG. 8 illustrates an exemplary structure of a feedback signal corresponding to a transport block, in accordance with this embodiment. As shown in FIG. 8, while the first bit 810 of the feedback signal may be 1 or 0 indicating an acknowledgement or a negative acknowledgement at the TB level depending on the detection and decoding result, the remaining bits 820, 830, 840, 850, 860 are filled up by a predetermined bit pattern. In this example, the predetermined bit pattern includes 1's at the second bit 820 and the last bit 860, and 0's at the other bits 830, 840, 850.

Figure 9:
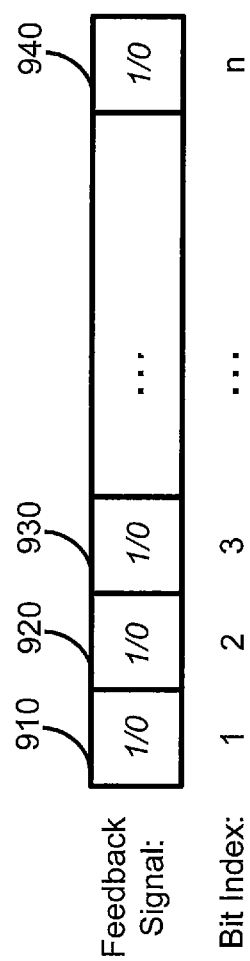
FIG. 9 illustrates a different exemplary structure of a feedback signal corresponding to a transport block, in accordance with some embodiments of the present disclosure.

In yet another embodiment, each of the feedback bits indicates an acknowledgement or a negative acknowledgement of a respective one of the code block groups (CBGs) in the transport block depending on a decoding result of the respective CBG, when the transport block analyzer 222 detects the transport block; and each of the feedback bits indicates a negative acknowledgement of a respective one of the CBGs in the transport block, when the transport block analyzer 222 misses detection of the transport block. FIG. 9 illustrates an exemplary structure of a feedback signal corresponding to a transport block, in accordance with this embodiment. As shown in FIG. 9, each bit 910, 920, 930, 940 of the feedback signal may be 1 or 0 indicating an acknowledgement or a negative acknowledgement at the CBG level of a respective CBG, depending on the detection and decoding result of the respective CBG.

In still another embodiment, each of the plurality of feedback signals is transmitted using a distinct transmission resource. That is, the feedback signals are not multiplexed. In this case, a feedback signal corresponding to each transport block scheduled by the fallback DCI includes a single feedback bit indicating an acknowledgement of the transport block when the transport block analyzer 222 detects and correctly decodes the transport block, and includes the same number of feedback bits as the number of code block groups in the transport block when the transport block analyzer 222 detects but does not correctly decode the transport block.

The power module 208 can include a power source such as one or more batteries, and a power regulator, to provide regulated power to each of the above-described modules in FIG. 2. In some embodiments, if the UE 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the UE 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the transport block analyzer 222. Conversely, each of the modules illustrated in FIG. 2 can be implemented using a plurality of separate components or elements.

Figure 3:
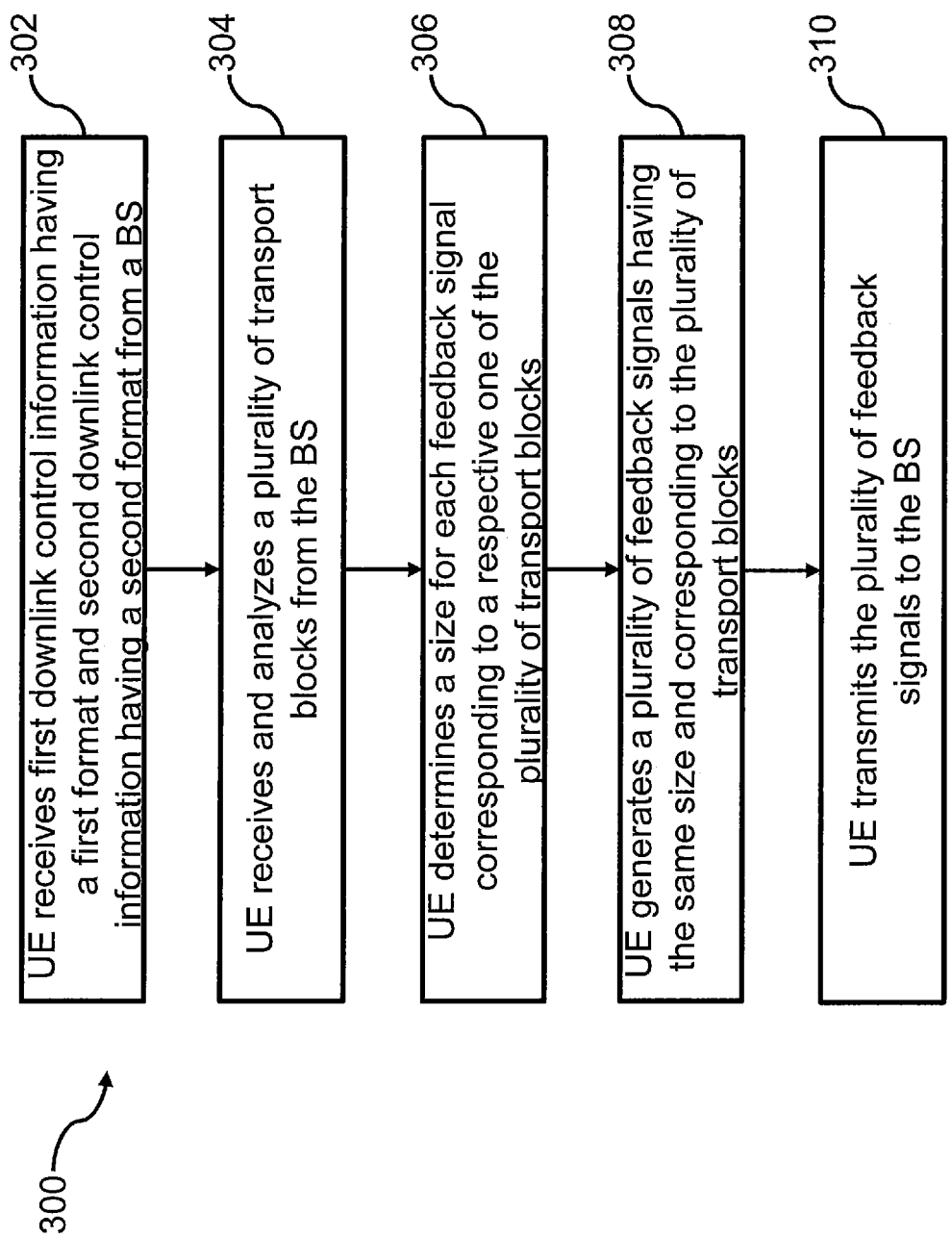
FIG. 3 illustrates a flow chart for a method performed by a UE for determining a size of a feedback signal in a wireless communication, in accordance with some embodiments of the present disclosure.

FIG. 3 illustrates a flow chart for a method 300 performed by a UE, e.g. the UE 200 in FIG. 2, for determining a size of a feedback signal in a wireless communication, in accordance with some embodiments of the present disclosure. At operation 302, the UE receives first downlink control information having a first format and second downlink control information having a second format from a BS. At operation 304, the UE receives and analyzes a plurality of transport blocks from the BS. The UE determines at operation 306 a size for each feedback signal corresponding to a respective one of the plurality of transport blocks. The UE generates at operation 308 a plurality of feedback signals having the same size and corresponding to the plurality of transport blocks. At operation 310, the UE transmits the plurality of feedback signals to the BS.

Figure 4:
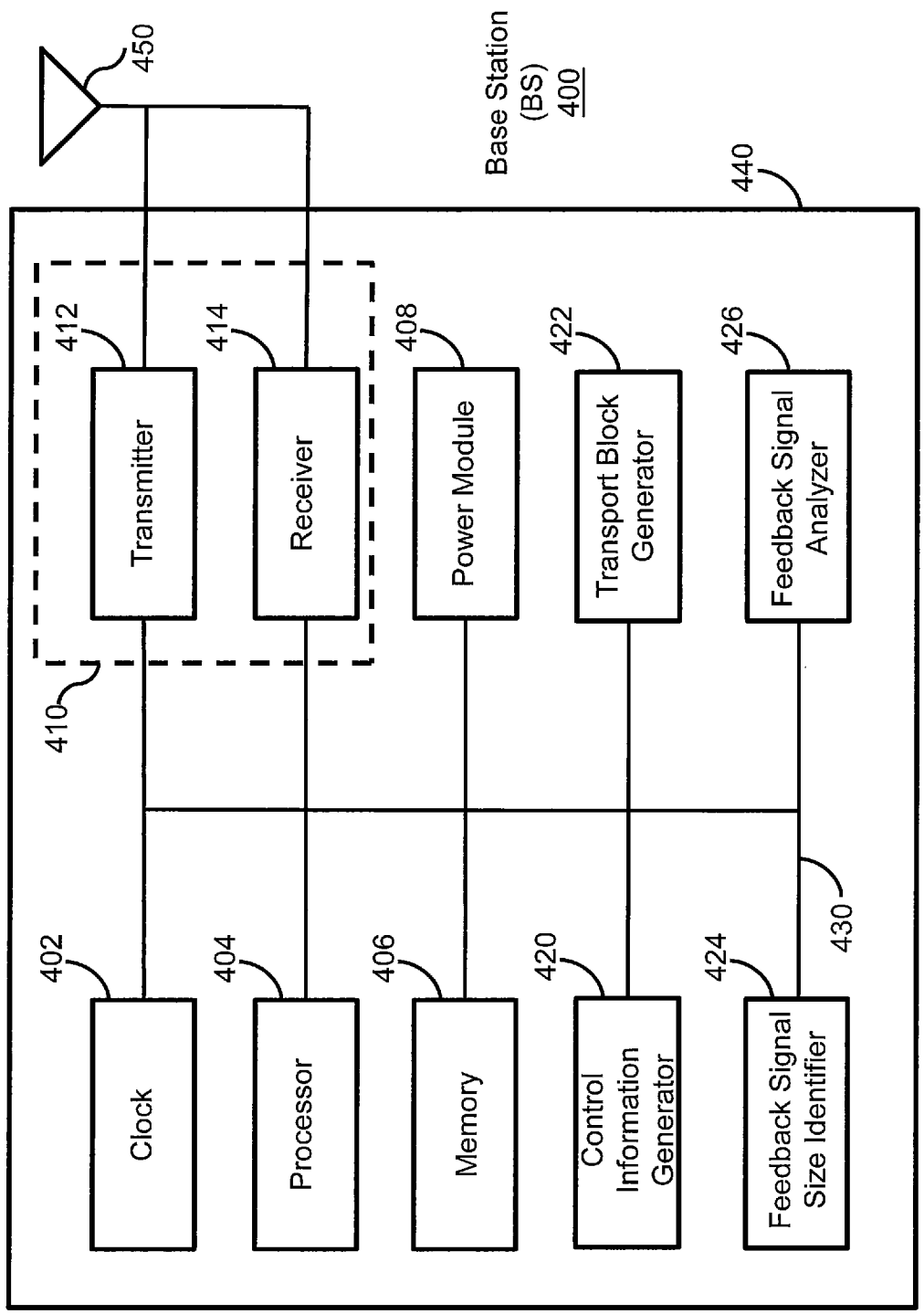
FIG. 4 illustrates a block diagram of a base station (BS), in accordance with some embodiments of the present disclosure.

FIG. 4 illustrates a block diagram of a BS 400, in accordance with some embodiments of the present disclosure. The BS 400 is an example of a device that can be configured to implement the various methods described herein. As shown in FIG. 4, the BS 400 includes a housing 440 containing a system clock 402, a processor 404, a memory 406, a transceiver 410 comprising a transmitter 412 and a receiver 414, a power module 408, a control information generator 420, a transport block generator 422, a feedback signal size identifier 424, and a feedback signal analyzer 426.

In this embodiment, the system clock 402, the processor 404, the memory 406, the transceiver 410 and the power module 408 work similarly to the system clock 202, the processor 204, the memory 206, the transceiver 210 and the power module 208 in the UE 200. An antenna 450 or a multi-antenna array 450 is typically attached to the housing 440 and electrically coupled to the transceiver 410.

The control information generator 420 may generate and transmit, via the transmitter 412, first DCI having a first format and second DCI having a second format to a UE, e.g. the UE 200. The DCIs may be used to schedule a plurality of TBs to be transmitted from the BS 400 to the UE 200. The DCIs can indicate whether feedback signals corresponding to the plurality of TBs are to be multiplexed using the same transmission resource or transmitted separately using different transmission resources. In one example, the first format indicates fallback mode DCI, where a transport block scheduled by the first format is required to trigger a feedback having a first size when not being multiplexed with other transport blocks; and the second format indicates non-fallback mode DCI, where a transport block scheduled by the second format is required to trigger a feedback having a second size when not being multiplexed with other transport blocks. The second size is different from the first size.

In one embodiment, the control information generator 420 schedules a first transport block, among the plurality of transport blocks, corresponding to a first feedback signal to be transmitted by the UE using a transmission resource. Then the control information generator 420 determines DCI for scheduling a second transport block among the plurality of transport blocks. If a second feedback signal corresponding to the second transport block is to be multiplexed with the first feedback signal using the same transmission resource, the control information generator 420 schedules the second transport block by the same DCI as the first transport block. If the second feedback signal is not to be multiplexed with the first feedback signal, the control information generator 420 schedules the second transport block by different DCI from the first transport block. The control information generator 420 may send the generated DCIs to the transport block generator 422 for generating transport blocks, and to the feedback signal size identifier 424 for identifying feedback signal sizes.

The transport block generator 422 in this example receives the generated DCIs from the control information generator 420 and generates a plurality of transport blocks each of which is scheduled by one of the first DCI and the second DCI. The transport block generator 422 may transmit, via the transmitter 412, the plurality of transport blocks to the UE 200. The transport block generator 422 may send the information about the transmitted transport blocks to the feedback signal size identifier 424 for identifying feedback signal sizes and to the feedback signal analyzer 426 for analyzing the feedback signals corresponding to the transmitted transport blocks.

The feedback signal size identifier 424 in this example can receive the generated DCI from the control information generator 420 and receive the information about the transmitted transport blocks from the transport block generator 422. The feedback signal size identifier 424 determines a size of a feedback signal to be received from the UE corresponding to each of the transport blocks, based on the generated DCI scheduling the transport block and/or the information of the transport block. In one example, each transport block scheduled by the non-fallback DCI includes the same number of code block groups; and the feedback signal size identifier 424 determines that a feedback signal corresponding to each transport block scheduled by the fallback DCI will include the same number of feedback bits as the number of code block groups when the feedback signal is multiplexed with another feedback signal corresponding to a transport block scheduled by the non-fallback DCI.

In various embodiments, the feedback signal size identifier 424 may determine the size of a feedback signal in a same manner as the feedback signal size determiner 224 in the UE 200. In one embodiment, the plurality of transport blocks are carried by at least one carrier; and transport blocks carried by the same carrier have the same number of code block groups. Then the feedback signal size identifier 424 can determine that a feedback signal corresponding to a first transport block scheduled by the fallback DCI includes the same number of feedback bits as the number of code block groups in a second transport block that is scheduled by the non-fallback DCI and carried by the same carrier as the first transport block. In another embodiment, the feedback signal size identifier 424 can determine that a feedback signal corresponding to a first transport block scheduled by the fallback DCI includes the same number of feedback bits as the number of code block groups in a second transport block that is scheduled by the second downlink control information; and the number is configured by the latest high layer signal, e.g. a Radio Resource Control (RRC) signal, correctly received by the UE 200 that has fed back an acknowledgement of the RRC signal. In yet another embodiment, the feedback signal size identifier 424 can determine that a feedback signal corresponding to each transport block includes the same and fixed number of bits set by the UE 200 and the BS 400, where the number is fixed regardless of the carrier information or configuration information of the high layer signal.

As discussed above, after the UE receives and decodes the transport blocks, the UE generates and transmits a feedback signal corresponding to each transport block to the BS. Here, after the feedback signal size identifier 424 receives, via the receiver 414, the plurality of feedback signals corresponding to the plurality of transport blocks from the UE 200, the feedback signal size identifier 424 can identify a size for each feedback signal, based on its feedback signal size determination discussed above. The feedback signal size identifier 424 can send the identified sizes for the received feedback signals to the feedback signal analyzer 426 for analyzing the feedback signals.

The feedback signal analyzer 426 in this example may receive, via the receiver 414, the plurality of feedback signals corresponding to the plurality of transport blocks from the UE 200, and analyze them based on the identified sizes from the feedback signal size identifier 424. In one example, the feedback signals have the same size regardless of the formats of DCI scheduling the transport blocks. For each transport block scheduled by fallback DCI, the feedback signal analyzed by the feedback signal analyzer 426 for the transport block may have a structure based on detection and/or decoding result of the transport block, and the identified size, according to various embodiments.

In one embodiment, each of the feedback bits indicates an acknowledgement of the transport block when the UE detects and correctly decodes the transport block. FIG. 6 illustrates an exemplary structure of a feedback signal corresponding to a transport block, in accordance with this embodiment.

In one embodiment, each of the feedback bits indicates a negative acknowledgement of the transport block, when the UE detects but does not correctly decode the transport block or when the UE misses detection of the transport block. When the UE misses detection of the transport block, the UE may use a mechanism, e.g. a downlink assignment index (DAI) mechanism, to identify the missed transport block and the location of the missed transport block within the plurality of transport blocks. FIG. 7 illustrates an exemplary structure of a feedback signal corresponding to a transport block, in accordance with this embodiment.

In another embodiment, one of the feedback bits indicates an acknowledgement of the transport block when the UE detects and correctly decodes the transport block, and indicates a negative acknowledgement of the transport block when the UE detects but does not correctly decode the transport block, and indicates a negative acknowledgement of the transport block when the UE misses detection of the transport block; and the remaining feedback bits have a predetermined pattern set by the UE 200 and the BS 400. FIG. 8 illustrates an exemplary structure of a feedback signal corresponding to a transport block, in accordance with this embodiment.

In yet another embodiment, each of the feedback bits indicates an acknowledgement or a negative acknowledgement of a respective one of the code block groups (CBGs) in the transport block depending on a decoding result of the respective CBG, when the UE detects the transport block; and each of the feedback bits indicates a negative acknowledgement of a respective one of the CBGs in the transport block, when the UE misses detection of the transport block. FIG. 9 illustrates an exemplary structure of a feedback signal corresponding to a transport block, in accordance with this embodiment.

In still another embodiment, each of the plurality of feedback signals is transmitted using a distinct transmission resource. That is, the feedback signals are not multiplexed. In this case, a feedback signal corresponding to each transport block scheduled by the fallback DCI includes a single feedback bit indicating an acknowledgement of the transport block when the UE detects and correctly decodes the transport block, and includes the same number of feedback bits as the number of code block groups in the transport block when the UE detects but does not correctly decode the transport block. After analyzing a feedback signal corresponding to a transport block, the BS 400 may re-transmit a CBG in the transport block or the entire transport block to the UE 200.

The various modules discussed above are coupled together by a bus system 430. The bus system 430 can include a data bus and, for example, a power bus, a control signal bus, and/or a status signal bus in addition to the data bus. It is understood that the modules of the BS 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the feedback signal size identifier 424. Conversely, each of the modules illustrated in FIG. 4 can be implemented using a plurality of separate components or elements.

Figure 5:
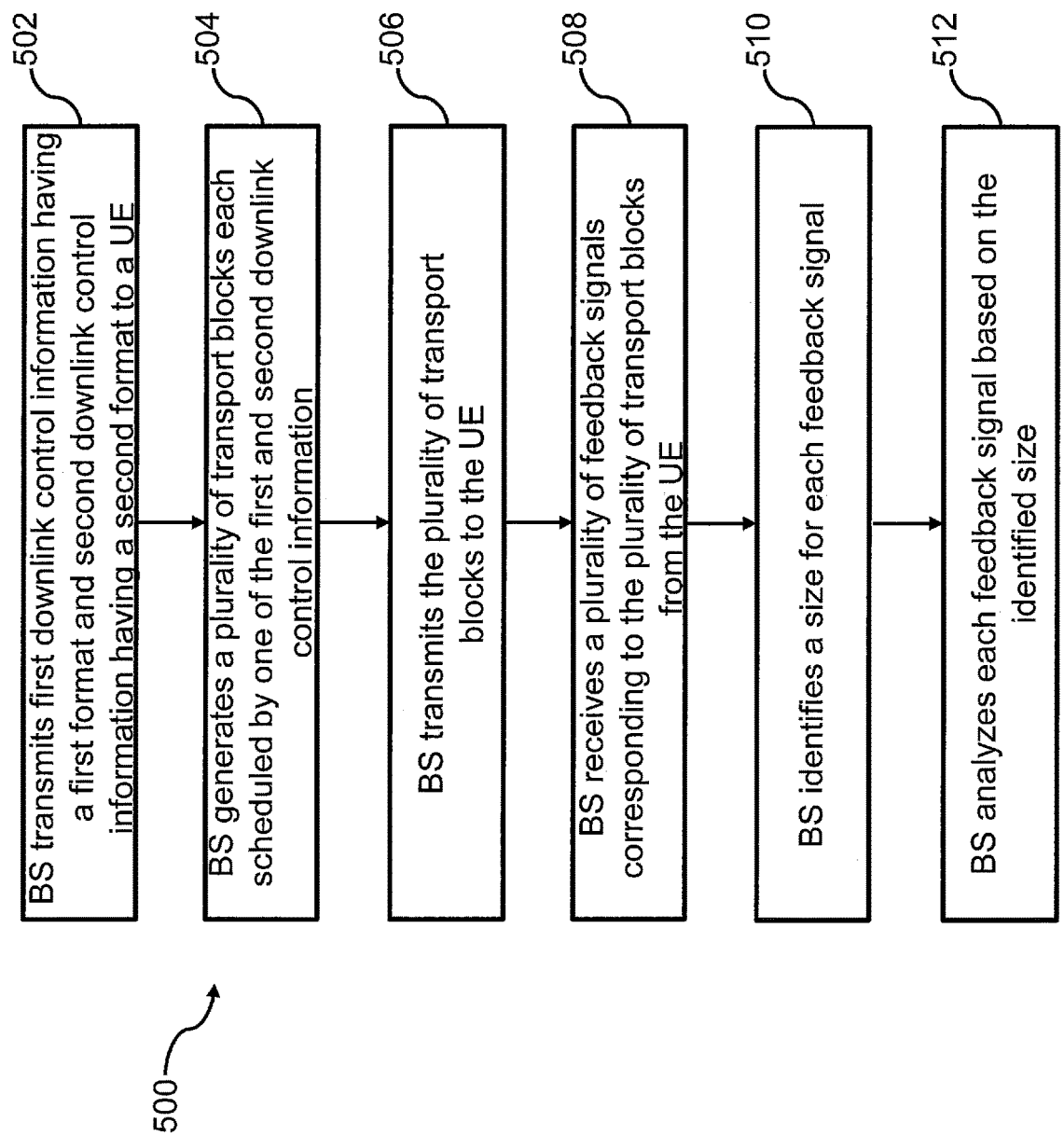
FIG. 5 illustrates a flow chart for a method performed by a BS for determining a size of a feedback signal in a wireless communication, in accordance with some embodiments of the present disclosure.

FIG. 5 illustrates a flow chart for a method 500 performed by a BS, e.g. the BS 400 in FIG. 4, for determining a size of a feedback signal in a wireless communication, in accordance with some embodiments of the present disclosure. At operation 502, the BS transmits first downlink control information having a first format and second downlink control information having a second format to a UE. At operation 504, the BS generates a plurality of transport blocks each scheduled by one of the first and second downlink control information. The BS transmits at operation 506 the plurality of transport blocks to the UE. The BS receives at operation 508 a plurality of feedback signals corresponding to the plurality of transport blocks from the UE. The BS identifies at operation 510 a size for each feedback signal. At operation 512, the BS analyzes each feedback signal based on the identified size.

Different embodiments of the present disclosure will now be described in detail hereinafter. It is noted that the features of the embodiments and examples in the present disclosure may be combined with each other in any manner without conflict.

In the NR system, when the UE is configured with the CBG retransmission mechanism, after the BS schedules a TB for the UE by using a fallback DCI, if the feedback signal corresponding to the TB is not multiplexed with other feedback signals from the UE, the UE is required to transmit a TB-level feedback signal. But this poses a problem if the feedback signal corresponding to the TB is to be multiplexed with other feedback signals from the UE.

Below is an example set forth to analyze the cause of the problem. Suppose that UE1 is configured with a CBG retransmission mechanism, the BS schedules TB1 at slot n for UE1 using fallback DCI, then the BS schedules TB2 at slot n+1 for UE1 using non-fallback DCI, and UE1 is required to feed back HARQ-ACKs of TB1 and TB2 at slot n+2, and the HARQ-ACKs for the two TBs are multiplexed. Further, suppose that the configured number of CBGs in the TB is 8. That is, one TB is divided into eight CBGs and one bit is fed back for each CBG. There are several possible situations on the UE side, as shown below.

In a first situation, suppose that the UE correctly detected the DCI of the two TBs. Here are 4 cases: if the UE correctly decodes the two TBs, the HARQ-ACK is formed by the UE as: 1+11111111, a total of 9 bits; if the UE correctly decodes TB1 and the second CBG in TB2 is not correctly decoded and all the other CBGs in TB2 are correctly decoded, then the HARQ-ACK is formed by the UE as 1+10111111, a total of 9 bits; if the UE correctly decodes TB2 and the second CBG in TB1 is not correctly decoded and all the other CBGs in TB1 are correctly decoded, then the HARQ-ACK is formed by the UE as 0+11111111, a total of 9 bits; and if the UE does not correctly decode TB1 and the second CBG in TB2 is not correctly decoded and all other CBGs are correctly decoded, the HARQ-ACK is formed by the UE as 0+10111111, a total of 9 bits.

In a second situation, suppose that the UE does not detect the DCI of one of the TBs. Due to the non-detection of the sequence of the TB among multiple TBs and the DCI format of the TB, there are a number of uncertainties in this situation. Since the UE does not know whether the DCI format of the undetected TB is fallback DCI or non-fallback DCI, the UE is unclear about forming TB HARQ-ACK or CBG HARQ-ACK for this TB. In this case, the base station and the UE should agree on rules in advance, and the UE forms a corresponding HARQ-ACK according to the agreed rules to facilitate decoding by the base station. Otherwise, the base station does not know the number of HARQ-ACK bits fed back by the UE and which feedback bits correspond to TB1 and which feedback bits correspond to TB2.

In a third situation, suppose that the UE does not correctly detect the DCI of both TBs. In this case, the UE considers that the base station is to schedule the data of UE, and the UE does not perform HARQ-ACK feedback.

In summary, the above three situations are likely to occur. As the number of multiplexed HARQ-ACKs for TBs increases, various possible situations may also increase. In this case, since the BS is not sure whether the UE correctly receives the DCI, the BS cannot accurately determine the total number of bits of a multiplexed signal, e.g. HARQ-ACK, fed back by the UE. As such, the BS cannot detect the HARQ-ACK, or the detection is too complicated. The present disclosure provides a method to simplify and solve the above problem.

In a first embodiment, the base station configures a CBG retransmission mechanism for the UE and schedules a plurality of TBs for the UE, and requires the UE to multiplex HARQ-ACK of a plurality of TBs. If the base station schedules some or all TBs using a fallback DCI, or any other DCI format that does not support the CBG retransmission mechanism, and if the UE detects that the DCI corresponding to the multiple TBs is fallback DCI, the UE forms the HARQ-ACK for the TB scheduled by the fallback DCI in the following manner: the number of bits of the final feedback formed for the TB is equal to the number of bits of CBG HARQ-ACK for the TB. For example, the number of CBGs configured for UE is 8, the CBG HARQ-ACK is 8 bits, and if the UE decodes TBs scheduled by the fallback DCI, a 1-bit TB HARQ-ACK is formed first and then the 1-bit HARQ-ACK is repeated until the number of bits is extended to 8 bits of the CBG HARQ-ACK. In another manner, for example, the UE forms a 1-bit TB HARQ-ACK for the TB and then extends to a required number of bits by filling the reserved bits. For example, the UE generates 1-bit TB HARQ-ACK first, and then refills 7 bits to 8 bits. Here it is assumed that is the number of bits of CBG HARQ-ACK is 8. Then the CBG HARQ-ACK is multiplexed and transmitted with CBG HARQ-ACKs for other TBs.

For the above-mentioned multiple TBs, if DCI corresponding to one or more of TBs is not detected, the UE can determine, through a downlink assignment index (DAI) mechanism, whether there is undetected DCI corresponding to these TBs. In this case, it does not matter whether the DCI is the fallback DCI or non-fallback DCI, since the UE cannot detect the format of the DCI, the UE does not know for sure. In one example, the HE processes these TBs with TB NACK and is consistent with the process of TBs scheduled by the fallback DCI. In another example, the UE performs CBG HARQ-ACK for these TBs. The method for determining the number of CBGs is consistent with the method for determining the number of bits of finally sent HARQ-ACK for TBs scheduled by the fallback DCI, or the number of CBGs is equal to the number of configured CBGs.

In this case, if the UE misses the detection of the TBs scheduled by fallback DCI, the base station would not misunderstand the total number of bits of the multiplexed HARQ-ACK for the multiple TBs sent by the UE. The reliability of the HARQ-ACK for the TBs scheduled by the fallback DCI is also increased.

In a second embodiment, suppose that the multiple TBs are from one or more carriers (or sub-bandwidths, also called partial bandwidths) and the number of CBGs configured in each carrier is the same, and the number of CBGs of TBs of different carriers may be configured to be different. Then the rule of forming a HARQ-ACK for a TB scheduled by the fallback DCI is that: the number of bits of the final feedback formed for the TB is equal to the number of bits of CBG HARQ-ACK for a TB that is scheduled by non-fallback DCI and is carried by the same carrier as the TB. For example, if the base station configures the number of CBGs corresponding to the TB carried by a certain carrier to be 4, the UE repeats the formed 1-bit TB HARQ-ACK for the TB up to 4 bits, and then multiplexes this TB HARQ-ACK with HARQ-ACKs for other TBs during feedback.

In a third embodiment, since the number of CBGs divided from one TB is configured by the base station through high-layer signaling, for example, a Radio Resource Control (RRC) message, due to possible reconfiguration of the RRC message, the UE may not receive a new RRC message for a long time during this period. In this case, the UE may not know the new number of CBGs configured by the base station in time. Therefore, on the basis of the first embodiment, the number of bits of the final feedback formed for the TB scheduled by fallback DCI is equal to the number of bits of CBG HARQ-ACK for the TB. In this case, the number of CBGs is configured by high-layer signaling previously received by UE or the latest high-level signaling configuration that UE correctly receives, which may refer to a case when the UE receives the high-layer signaling correctly and has sent a HARQ-ACK for the high-layer signaling and the base station correctly receives the HARQ-ACK.

In a fourth embodiment, since the number of CBGs divided from one TB is configured by the base station through high-layer signaling, for example, a RRC message, due to possible reconfiguration of the RRC message, the UE may not receive a new RRC message for a long time during this period. In this case, the UE may not know the new number of CBGs configured by the base station in time. Therefore, on the basis of the second embodiment, the number of bits of the final feedback formed for the TB scheduled by fallback DCI is equal to the number of bits of CBG HARQ-ACK for a TB that is scheduled by non-fallback DCI and is carried by the same carrier as the TB. In this case, the number of CBGs is configured by high-layer signaling previously received by UE or the latest high-level signaling configuration that UE correctly receives, which may refer to a case when the UE receives the high-layer signaling correctly and has sent a HARQ-ACK for the high-layer signaling and the base station correctly receives the HARQ-ACK.

In a fifth embodiment, based on the first or the second embodiment, a fixed codebook is required to be used when the HARQ-ACKs of the multiple TBs are multiplexed. Then for the TBs scheduled by fallback DCI, the UE can follow one of methods illustrated in the first to the fourth embodiments to determine the number of feedback bits and form corresponding feedback signal, while the number of feedback bits is fixed regardless of the carrier information or configuration information of high layer signaling.

In a sixth embodiment, based on the first to the fourth embodiments, the UE generates bits of the final feedback formed for the TB scheduled by fallback DCI to be same as bits of CBG HARQ-ACK for a TB that is scheduled by non-fallback DCI, when the UE detects and correctly decodes the TB. That is, each feedback bit corresponds to a respective CBG, when the UE detects and correctly decodes the TB. When the UE missed detection of the TB, i.e. the UE did not correctly receive or detect the DCI scheduling the TB, the UE also generates bits of the final feedback formed for the TB scheduled by fallback DCI to be same as bits of CBG HARQ-ACK for a TB that is scheduled by non-fallback DCI, while each CBG is fed back a negative acknowledgement (NACK) in this case. It can be understood that the number of CBGs may be determined according to any one of the methods illustrated in the first to the fourth embodiments.

In a seventh embodiment, based on the first to the fourth embodiments, if the base station schedules the multiple TBs for the UE and requires the HARQ-ACK for one scheduled TB (from the multiple TBs) to be multiplexed with HARQ-ACK for a previous TB, the base station schedules the TB by using the same DCI format as the previous TB. Therefore, for the multiple TBs whose feedback signals are multiplexed, one same DCI format would always be used. For example, the DCI format that supports the CBG retransmission mechanism or the fallback DCI format is always used. The UE determines, according to the DCI format for scheduling multiple TBs, to form a TB HARQ-ACK or a CBG HARQ-ACK for each TB to be multiplexed and transmitted.

In one example, if the base station schedules TB1 for UE1 and uses a certain DCI format (DCI format supporting CBG or DCI format not supporting CBG), when the base station schedules TB2 for UE1, the base station uses the same DCI as the previous TB (that is, TB1) format. At the same time, the base station can instruct HARQ-ACK for TB2 to be multiplexed with HARQ-ACK for TB1. When the base station schedules TB3 for UE1 and continues to use the same DCI format as the previous TB, the base station can also instruct HARQ-ACK for TB3 to be multiplexed with HARQ-ACK for TB1 and/or HARQ-ACK for TB2.

In another example, if the base station schedules TB1 for UE1 and uses a certain DCI format (DCI format supporting CBG or DCI format not supporting CBG), and if the base station schedules TB2 for UE1 and does not use the same format as the DCI format for scheduling the previous TB (that is, TB1), then the base station should configure that the HARQ-ACK for TB2 not to be multiplexed with the HARQ-ACK for TB1. If the base station uses the same DCI format as the DCI format scheduling TB1 to schedule the TB3 for the UE1, the base station can simultaneously configure the HARQ-ACK for TB3 to be multiplexed with the HARQ-ACK for TB1. If the base station uses the same DCI format as the DCI format scheduling TB2 to schedule the TB3 for the UE1, the base station can simultaneously configure the HARQ-ACK for TB3 to be multiplexed with the HARQ-ACK for TB2.

For multiplexing HARQ-ACK for different TBs, the base station configures the HARQ-ACKs for TBs scheduled by the same DCI format (DCI format supporting CBG or DCI format not supporting CBG) to be multiplexed and configures separate HARQ-ACKs for TBs scheduled by different DCI formats to be fed back individually.

In an eighth embodiment, different from the first to the fourth embodiments where there is a limitation that the HARQ-ACKs corresponding to the multiple TBs of the UE are required to be multiplexed together, the following methods according to the eighth embodiment may be used without such limitation.

The base station configures the CBG retransmission mechanism for the UE and requires the UE to send the CBG HARQ-ACK. If the UE detects that the base station uses the fallback DCI (or other DCI formats that do not support the CBG retransmission mechanism) to schedule the TB for the UE, then the number of bits of HARQ-ACK for the TB fed back by the UE is determined by the number of configured CBGs (for example, both are equal). The number of configured CBGs is the number of CBGs divided from a TB, which is notified to the UE when the base station configures the CBG retransmission mechanism for the UE. The HARQ-ACK for the TB fed back by the UE is formed as a TB HARQ-ACK and then extended to the required number of bits according to a predefined encoding rule, which thus increases the reliability. The transmission resource for this TB HARQ-ACK is the transmission resource of CBG HARQ-ACK for the TB.

Alternatively, for a TB scheduled by a base station using a fallback DCI and the UE detects the DCI of the TB, if the UE correctly decodes the TB, then the UE feeds back a TB HARQ-ACK (or conducting the above-mentioned encoding extension processing for the TB HARQ-ACK and then sending the TB HARQ-ACK). If the TB is not correctly decoded, the UE feeds back the CBG HARQ-ACK. In this case, the UE uses the transmission resource of CBG HARQ-ACK for the TB.

For a single TB scheduled by a base station using a fallback DCI and the UE does not detect the DCI of the TB, because the UE does not know the DCI format of the TB and does not know it missed the detection of this TB if there is no DAI mechanism, the UE would not do any processing.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication device, the method comprising:
   receiving first downlink control information having a first format and second downlink control information having a second format from a wireless communication node;
   receiving a plurality of transport blocks from the wireless communication node, wherein each of the plurality of transport blocks is scheduled by one of the first downlink control information and the second downlink control information; and
   transmitting a plurality of feedback signals to the wireless communication node, where each of the plurality of feedback signals has the same size and corresponds to a respective one of the plurality of transport blocks, wherein:
      a feedback signal corresponding to a transport block scheduled by the first downlink control information having the first format is at a level of transport block, and
      a feedback signal corresponding to a transport block scheduled by the second downlink control information having the second format is at a level of code block group.

2. The method of claim 1, wherein the plurality of feedback signals are multiplexed using the same transmission resource.

3. The method of claim 1, wherein:
   the first format indicates fallback mode downlink control information; and
   the second format indicates non-fallback mode downlink control information.

4. The method of claim 1, wherein:
   each transport block scheduled by the second downlink control information includes a same configured number of code block groups; and
   a feedback signal corresponding to each transport block scheduled by the first downlink control information includes feedback bits whose quantity is the same as the configured number of code block groups.

5. The method of claim 4, wherein:
   one of the feedback bits indicates one of the following:
      an acknowledgement of the transport block according to the wireless communication device detects and correctly decodes the transport block,
      a negative acknowledgement of the transport block according to the wireless communication device detects but does not correctly decode the transport block, or
      a negative acknowledgement of the transport block according to the wireless communication device misses detection of the transport block; and
   the remaining feedback bits have a predetermined pattern.

6. The method of claim 1, wherein:
   transport blocks carried by a same carrier have a same number of code block groups.

7. The method of claim 4, wherein:
   a first bit of the feedback signal indicates a hybrid automatic repeat request acknowledgment (HARQ-ACK) for the transport block; and
   each of the remaining feedback bits of the feedback signal is a copy of the first bit.

8. A method performed by a wireless communication node, the method comprising:
   transmitting first downlink control information having a first format and second downlink control information having a second format to a wireless communication device;
   transmitting a plurality of transport blocks to the wireless communication device, wherein each of the plurality of transport blocks is scheduled by one of the first downlink control information and the second downlink control information; and
   receiving a plurality of feedback signals from the wireless communication device, where each of the plurality of feedback signals has the same size and corresponds to a respective one of the plurality of transport blocks, wherein:
      a feedback signal corresponding to a transport block scheduled by the first downlink control information having the first format is at a level of transport block, and
      a feedback signal corresponding to a transport block scheduled by the second downlink control information having the second format is at a level of code block group.

9. The method of claim 8, wherein the plurality of feedback signals are multiplexed by the wireless communication device using the same transmission resource.

10. The method of claim 8, wherein:
    the first format indicates fallback mode downlink control information;
    the second format indicates non-fallback mode downlink control information.

11. The method of claim 8, wherein:
    each transport block scheduled by the second downlink control information includes a same configured number of code block groups; and
    a feedback signal corresponding to each transport block scheduled by the first downlink control information includes feedback bits whose quantity is the same as the configured number of code block groups.

12. The method of claim 11, wherein:
one of the feedback bits indicates one of the following:
- an acknowledgement of the transport block according to the wireless communication device detects and correctly decodes the transport block,
- a negative acknowledgement of the transport block according to the wireless communication device detects but does not correctly decode the transport block, or
- a negative acknowledgement of the transport block according to the wireless communication device misses detection of the transport block; and the remaining feedback bits have a predetermined pattern.

13. The method of claim 8, wherein:
transport blocks carried by a same carrier have a same number of code block groups.

14. The method of claim 11, wherein:
- a first bit of the feedback signal indicates a hybrid automatic repeat request acknowledgment (HARQ-ACK) for the transport block; and
- each of the remaining feedback bits of the feedback signal is a copy of the first bit.

15. A first communication apparatus comprising a processor, a memory, and a wireless interface, wherein the memory stores instructions that, when executed, causes the processor to:
- receive first downlink control information having a first format and second downlink control information having a second format from a second communication apparatus;
- receive a plurality of transport blocks from the second communication apparatus, wherein each of the plurality of transport blocks is scheduled by one of the first downlink control information and the second downlink control information; and
- transmit a plurality of feedback signals to the second communication apparatus, where each of the plurality of feedback signals has the same size and corresponds to a respective one of the plurality of transport blocks, wherein:
  - a feedback signal corresponding to a transport block scheduled by the first downlink control information having the first format is at a level of transport block, and
  - a feedback signal corresponding to a transport block scheduled by the second downlink control information having the second format is at a level of code block group.

16. A first communication apparatus comprising a processor, a memory, and a wireless interface, wherein the memory stores instructions that, when executed, causes the processor to:
- transmit first downlink control information having a first format and second downlink control information having a second format to a second communication apparatus;
- transmit a plurality of transport blocks to the second communication apparatus, wherein each of the plurality of transport blocks is scheduled by one of the first downlink control information and the second downlink control information; and
- receive a plurality of feedback signals from the second communication apparatus, where each of the plurality of feedback signals has the same size and corresponds to a respective one of the plurality of transport blocks, wherein:
  - a feedback signal corresponding to a transport block scheduled by the first downlink control information having the first format is at a level of transport block, and
  - a feedback signal corresponding to a transport block scheduled by the second downlink control information having the second format is at a level of code block group.

* * * * *